(12) United States Patent
Choi et al.

(10) Patent No.: US 11,511,253 B2
(45) Date of Patent: Nov. 29, 2022

(54) METHOD AND APPARATUS FOR FABRICATING CAPSULE

(71) Applicant: KOREA INSTITUTE OF SCIENCE AND TECHNOLOGY, Seoul (KR)

(72) Inventors: Sun Choi, Seoul (KR); Youngkyun Jung, Seoul (KR); Ung Su Choi, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 271 days.

(21) Appl. No.: 16/810,229

(22) Filed: Mar. 5, 2020

(65) Prior Publication Data

US 2021/0138422 A1 May 13, 2021

(30) Foreign Application Priority Data

Nov. 7, 2019 (KR) .......................... 10-2019-0141923

(51) Int. Cl.
 *B01J 13/14* (2006.01)
(52) U.S. Cl.
 CPC ..................................... *B01J 13/14* (2013.01)
(58) Field of Classification Search
 None
 See application file for complete search history.

(56) References Cited

U.S. PATENT DOCUMENTS

| | | | | |
|---|---|---|---|---|
| 2003/0194443 A1* | 10/2003 | Yano | ........................ | A61K 8/35 264/4.1 |
| 2008/0166555 A1* | 7/2008 | Lang-Wittkowski | ...... | B01J 2/20 264/176.1 |

FOREIGN PATENT DOCUMENTS

KR 10-1907547 B1 10/2018

* cited by examiner

*Primary Examiner* — Jeffrey D Washville
(74) *Attorney, Agent, or Firm* — Rabin & Berdo, P.C.

(57) ABSTRACT

Provided is a method of fabricating capsules. The method includes: forming droplets of a dispersed phase solution including a phase transition material, a carbon nanomaterial, and a first monomer by allowing the dispersed phase solution to pass through nozzle units provided at a porous membrane in a reaction tank including the porous membrane; migrating the droplets into a mobile phase material including a second monomer; and forming polymer shells at interfaces between the droplets and the mobile phase material by polymerization between the first monomer and the second monomer.

8 Claims, 8 Drawing Sheets

SEPARATION OF DROPLET

METHOD AND APPARATUS FOR FABRICATING CAPSULE

CROSS-REFERENCE TO RELATED APPLICATION

This application claims the benefit of Korean Patent Application No. 10-2019-0141923, filed on Nov. 7, 2019, in the Korean Intellectual Property Office, the disclosure of which is incorporated herein in its entirety by reference.

BACKGROUND

1. Field

The present invention relates to methods and apparatuses for fabricating capsules, and more particularly to, methods and apparatuses for mass-producing capsules having high thermal conductivity for storing thermal energy.

2. Description of the Related Art

Encapsulation technologies for particular functional materials have been applied to various fields to encapsulate materials, medicines, pesticides, cosmetics, and the like. However, existing encapsulation technologies are not suitable for mass production. This is because wide size distribution of generated capsules makes it difficult to produce capsules having a desired size, encapsulation yields are low, the sizes of the capsules are limitedly adjusted in a narrow range of several nanometers to several hundreds of micrometers, and costs for encapsulation process are high. Due to these problems, encapsulation technologies are currently limited to the extent of allowing studies thereon only in laboratories, and various solutions are required to industrially apply and utilize the existing encapsulation technologies. Therefore, there is a need to develop a system including a simple process of fabricating capsules capable of uniformly regulating capsule size for mass production thereof.

Conventional encapsulation processes are classified into chemical methods, physiochemical methods, and mechanical methods. The chemical methods include suspension polymerization, emulsion polymerization, precipitation polymerization, interfacial polycondensation, curing-in-liquid method, and the like, the physiochemical methods include drying-in-liquid method, phase inversion emulsification, coacervation (phase separation) method, and the like, and the mechanical methods include spray-drying method, heteroaggregation, and the like. Most of the above-described conventional encapsulation processes include a method of forming emulsion droplets and forming outer walls on the surfaces of the emulsion droplets, but there may be problems in that it is difficult to control size of the emulsion droplets, encapsulation yields may be low, an average size of producible capsules that small, and it is difficult to generate capsules having uniform physical properties.

Recently, a microencapsulation method capable of forming a capsule by simultaneously pressing an emulsion and a material used to form an outer wall has been developed to adjust the ratio of the emulsion and the outer wall and the size thereof to solve these problems of the above-described encapsulation. According to this technique, a uniform capsule may be fabricated and a degree of encapsulation achieved thereby is nearly 100%. However, productivity decreases since only one capsule is fabricated at a time, the size of the capsule is limited to a micrometer scale, and economical efficiency decreases because a flow of a mobile phase material is continuously supplied to maintain the capsule.

Korean Patent No. 10-1907547 discloses a method of manufacturing a capsule having a core-shell structure by using density differences between a core material and a shell material constituting the capsule and between a capsule material and a mobile phase material. However, this method is less efficient since it is restricted to a density gradient, and this method results in low selectivity since a mixture of mononuclear and multinuclear capsules is produced. In addition, it is inconvenient to perform a curing process using UV rays or heat after generating the capsule.

RELATED ART

Patent Documents

Patent Document 1: Korean Patent No. 1907547 (Oct. 5, 2018)

SUMMARY

Thus, the present invention has been proposed to solve various problems including the above problems, and an object of the present invention is to provide a method of fabricating capsules each having a core-shell structure and excellent thermal conductivity with thermal properties of a phase transition material remained by polymerization. Another object of the present invention is to provide an apparatus for fabricating capsules enabling mass production thereof. However, these problems to be solved are illustrative and the scope of the present invention is not limited thereby.

Additional aspects will be set forth in part in the description which follows and, in part, will be apparent from the description, or may be learned by practice of the presented embodiments.

According to an aspect of the present invention to achieve the object, provided is a method of fabricating capsules.

According to an embodiment of the present invention, the method of fabricating capsules includes: forming droplets of a dispersed phase solution including a phase transition material, a carbon nanomaterial, and a first monomer by allowing the dispersed phase solution to pass through nozzle units provided at a porous membrane in a reaction tank including the porous membrane; migrating the droplets into a mobile phase material including a second monomer; and forming polymer shells respectively at interfaces between the droplets and the mobile phase material by polymerization between the first monomer and the second monomer.

According to an embodiment of the present invention, the method of fabricating capsules includes: forming droplets of a dispersed phase solution including a phase transition material, a carbon nanomaterial, and a first monomer by allowing the dispersed phase solution to pass through nozzle units provided at a porous membrane in a reaction tank including the porous membrane; migrating the droplets into a first mobile phase material to form intermediate coating layers including the first mobile phase material on the surfaces of the droplets; migrating the droplets each having the intermediate coating layer into a second mobile phase material comprising a second monomer; and forming polymer shells on the surfaces of the intermediate coating layer by polymerization between the first monomer and the second monomer.

According to an embodiment of the present invention, the first monomer may include an organic compound or phosgene having at least one functional group selected from the group consisting of an isocyanate group, a carboxyl group, and a cyano group.

According to an embodiment of the present invention, the second monomer may be a compound having an amine group or a hydroxyl group.

According to an embodiment of the present invention, the carbon nanomaterial may be selected from the group consisting of graphite, graphene, carbon fiber, and carbon nanotube (CNT).

According to an embodiment of the present invention, the forming of droplets may be performed by allowing the dispersed phase solution to pass through the nozzle units at a flow rate of 0.1 ml to 20 ml.

According to an embodiment of the present invention, the polymerization may be performed as a continuous process in a temperature range of 25° C. to 120° C.

According to an embodiment of the present invention, the intermediate coating layer may be formed to have a thickness of 3 mm to 20 mm.

According to an embodiment of the present invention, the second mobile phase material may have a density higher than that of the dispersed phase solution and lower than that of the first mobile phase material.

According to an embodiment of the present invention, the phase transition material may include at least one selected from the group consisting of paraffin, naphthalene, biphenyl, erythritol, $C_{10-30}$ fatty acid, $C_{10-30}$ fatty alcohol, polycaprolactone (PCL), and polyethyleneglycol.

According to another aspect of the present invention, provided is an apparatus for fabricating capsules fabricated according to above-described method.

According to an embodiment of the present invention, the apparatus for fabricating capsules may include: a reaction tank configured to provide a space for generating capsules; and a porous membrane disposed at a position spaced apart from the bottom of the reaction tank and comprising a plurality of nozzle units, wherein a dispersed phase solution is contained in the nozzle units.

According to an embodiment of the present invention, the reaction tank may contain a mobile phase material, and the dispersed phase solution having passed through the nozzle unit migrates into the mobile phase material to form a polymer shell by polymerization.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
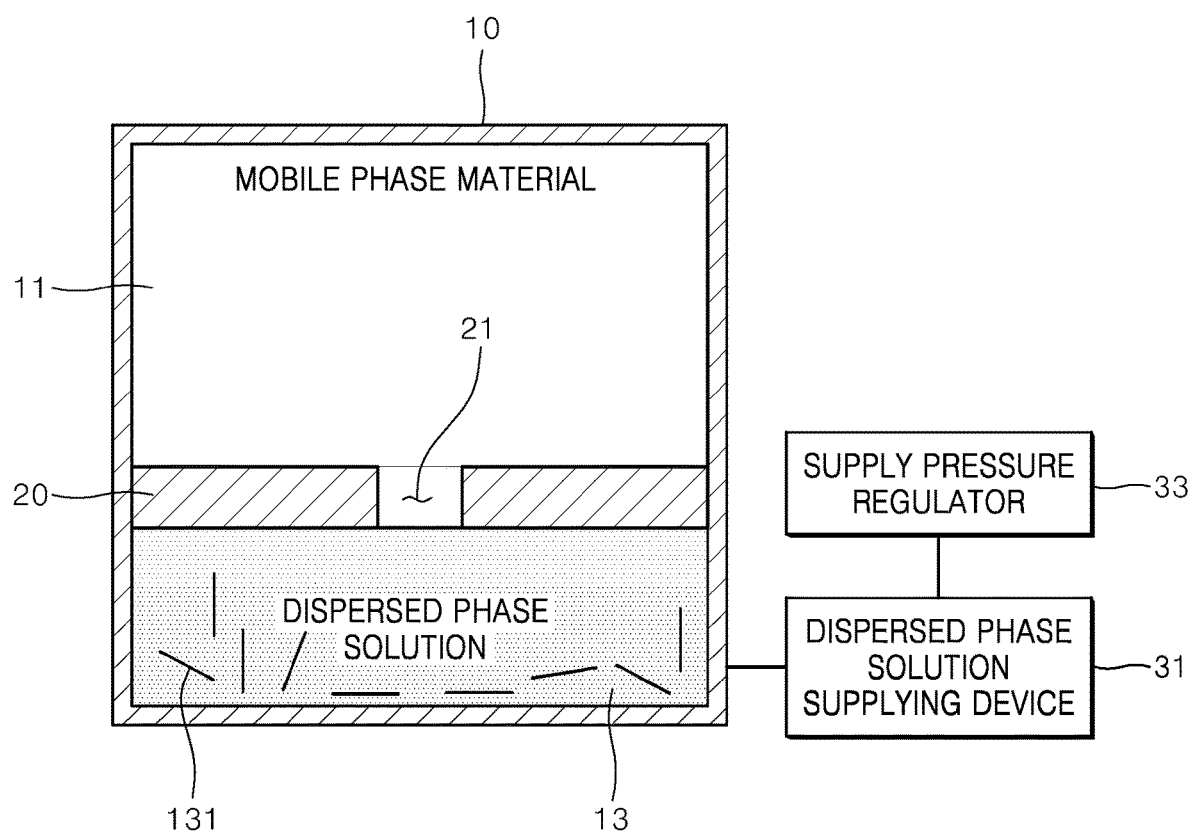
FIG. 1 is a schematic diagram of an apparatus for fabricating capsules for describing a method of fabricating the capsules according to an embodiment of the present invention.

Hereinafter, embodiments of the present disclosure will be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the concept of the invention to those skilled in the art. In the drawings, the thicknesses of layers and regions are exaggerated for descriptive convenience and clarity.

The present invention provides a method of fabricating capsules having various sizes with a high yield via a simple process. The capsules fabricated according to the present invention are economical, since they are manufactured by a simple process, and the capsules have high thermal conductivity by including a material having high thermal conductivity with thermal properties of a phase transition material remained. Thus, the capsules may be used efficiently in various fields as heat storing materials used to control thermal properties, materials used to control overheating of electronic devices, materials for solar energy, automotive parts, construction materials, and textile materials.

Hereinafter, an apparatus for fabricating capsules according to an embodiment of the present invention will be described in detail with reference to the drawings.

Referring to FIG. 1, an apparatus for fabricating capsules according to an embodiment of the present invention includes a reaction tank 10. The reaction tank 10 provides a space for generating capsules. The porous membrane 20 induces formation of a core material and includes a plurality of nozzle units 21. Each of the nozzle units 21 provided at a pore of the porous membrane 20 includes a hollow nozzle vertically penetrating the porous membrane 20. When a dispersed phase solution is introduced into one end of the nozzle unit 21, a droplet is formed and discharged out of the other end of the nozzle unit 21. The porous membrane 20 is provided at a position spaced apart from the bottom of the reaction tank 10.

A portion of the reaction tank 10 under the porous membrane 20 is filled with a dispersed phase solution 13 including a phase transition material, a carbon nanomaterial 131, and a first monomer. That is, the dispersed phase solution 13 is filled up to a predetermined height of the reaction tank 10 such that the porous membrane 20 is located on the dispersed phase solution 13. A portion of the reaction tank 10 over the porous membrane 20 may be filled with a mobile phase material 11. While the dispersed phase solution 13 passes through the nozzle unit 21 of the porous membrane 20, a droplet is formed. When the droplet is introduced into the mobile phase material 11 including a second monomer, a polymer shell may be formed at the interface between the droplet and the mobile phase material 11 via polymerization between the first monomer and the second monomer.

Figure 2:
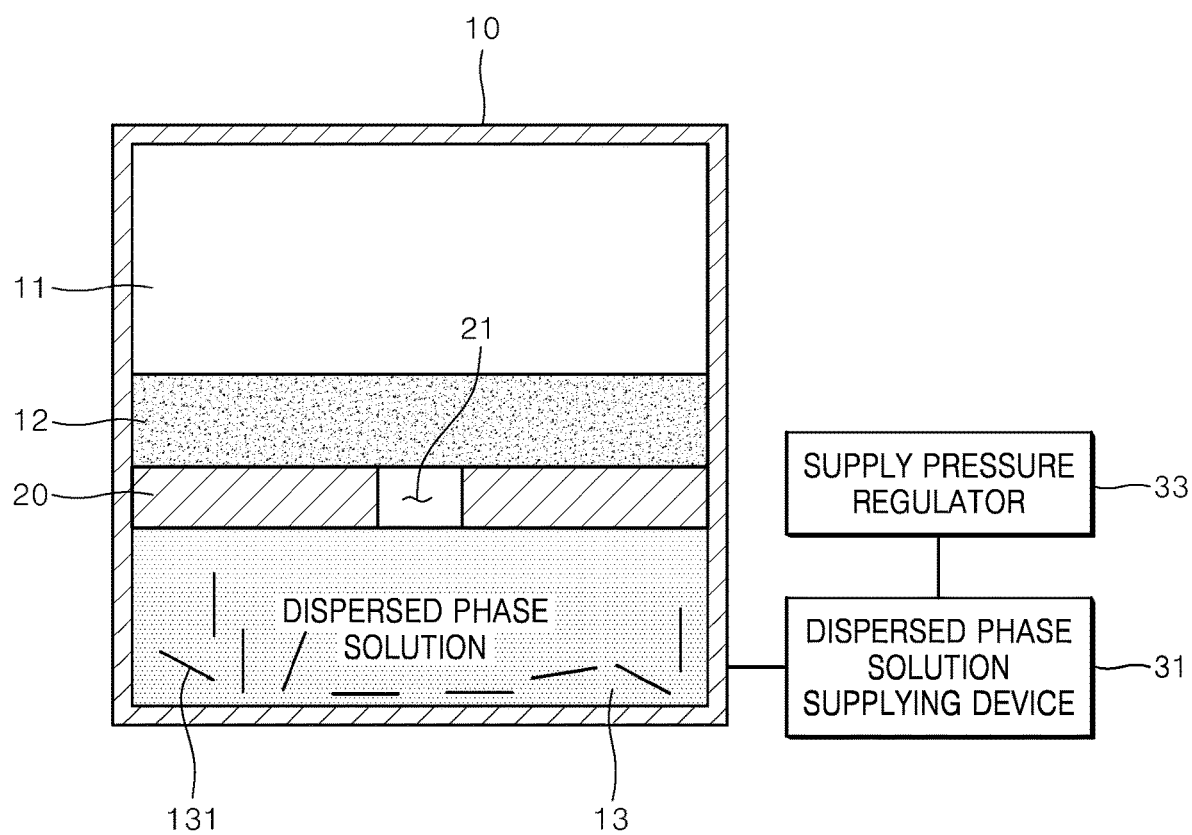
FIG. 2 is a schematic diagram of an apparatus for fabricating capsules for describing a method of fabricating the capsules according to another embodiment of the present invention.

Referring to FIG. 2, an apparatus for fabricating capsules according to another embodiment of the present invention may include a first mobile phase material 12 and a second mobile phase material 11 sequentially contained on the porous membrane 20 due to density difference.

Figure 3:
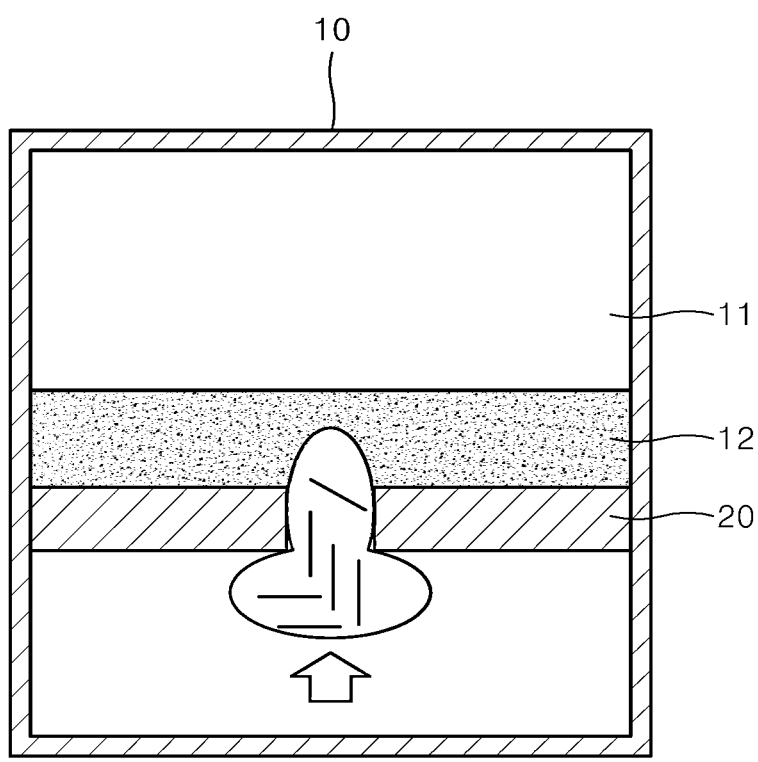
FIG. 3 is a reference diagram illustrating a method of generating a capsule by applying a pressure in an apparatus for fabricating capsules according to an embodiment of the present invention.
Figure 4:
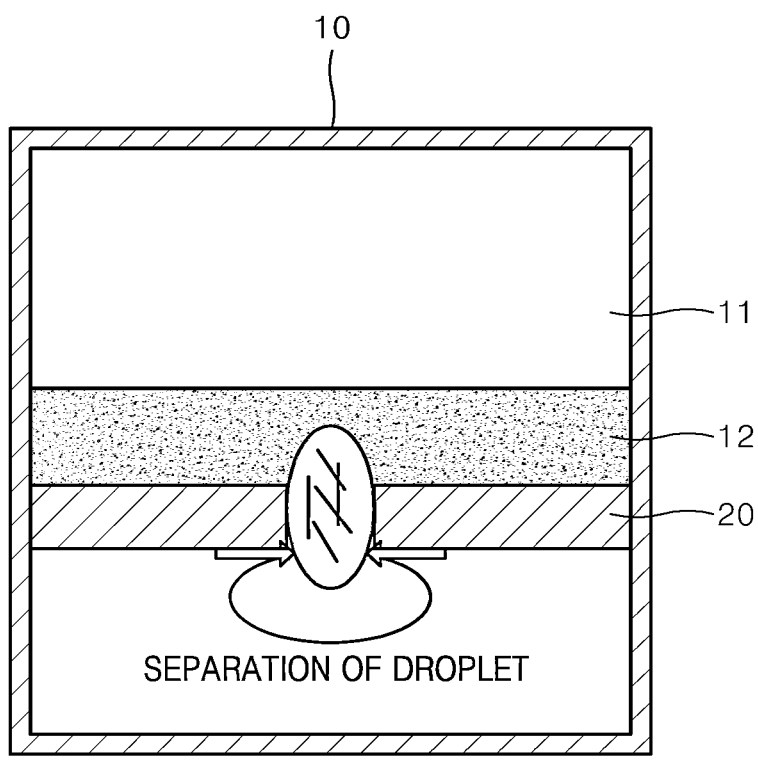
FIG. 4 is a reference diagram for describing a process of separating a droplet in an apparatus for fabricating capsules according to an embodiment of the present invention.
Figure 5:
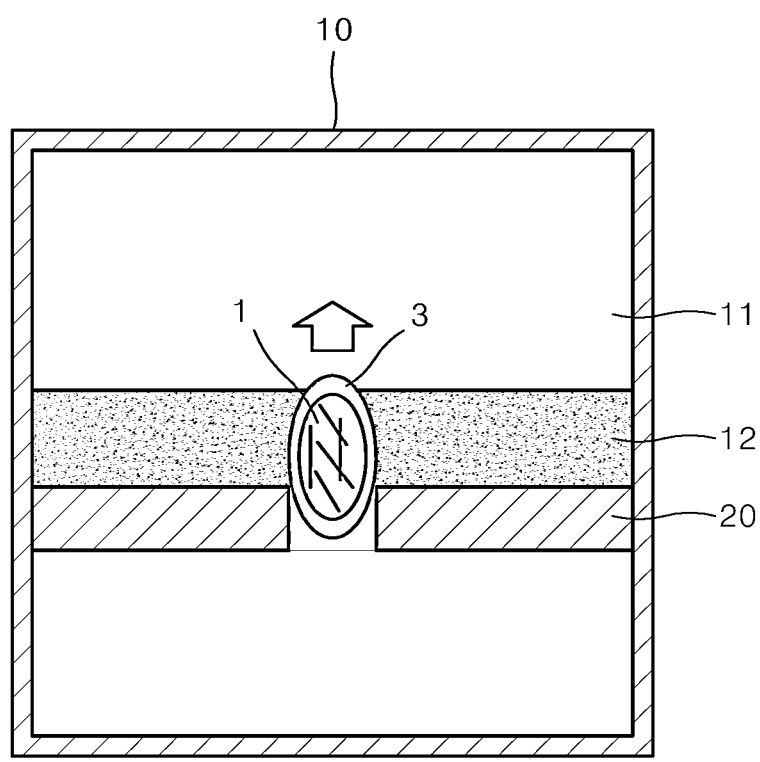
FIG. 5 is a reference diagram illustrating a process of forming an intermediate coating layer on the surface of a droplet in an apparatus for fabricating capsules according to an embodiment of the present invention.

A capsule fabricated according to the present invention has a core-shell structure in which a core 1 is located at the center and a polymer shell 2 is formed on an outer wall of the core 1. Referring to FIG. 3, in the reaction tank 10, when a pressure is applied to the dispersed phase solution 13, the dispersed phase solution 13 flows into the nozzle unit 21 by the applied pressure and forced to pass through the nozzle unit 21 of the porous membrane 20 to eliminate the applied pressure. In this case, the dispersed phase solution 13 is separated as a droplet to minimize a surface energy (See FIG. 4). During a process of discharging the droplet through the nozzle unit 21, the droplet is brought into contact with the first mobile phase material 12 disposed over the porous membrane 20 to form an intermediate coating layer 3 on the surface of the droplet (See FIG. 5). The intermediate coating layer 3 may prevent the nozzle unit 21 from being clogged with the droplet that may be hardened on the surface of the nozzle unit 21 when the droplet having passed through the nozzle unit 21 is immediately introduced into the second mobile phase material 11. The intermediate coating layer 3 may control a concentration of the filler of the carbon nanomaterial 131 in the capsule. In addition, by adjusting a thickness of the intermediate coating layer 3, a release of a part of the carbon nanomaterial 131 out of the core 1 may be prevented. Preferably, the thickness of the intermediate coating layer 3 may be in the range of 3 mm to 5 mm.

Figure 6:
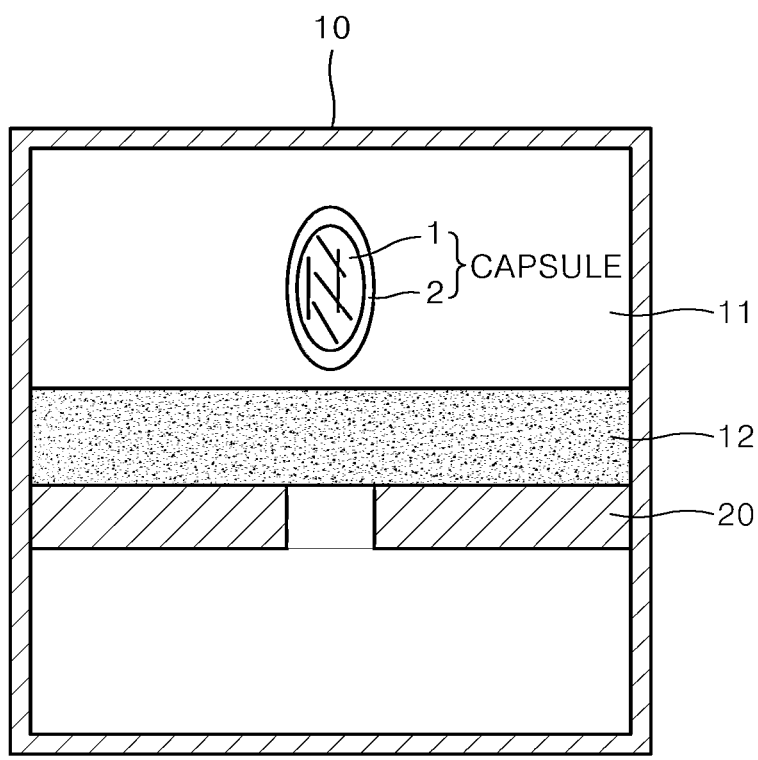
FIG. 6 is a reference diagram illustrating a capsule having a core-shell structure prepared in an apparatus for fabricating capsules according to an embodiment of the present invention.

By applying continuous pressure, the droplet having passed through the nozzle unit 21 is discharged into the second mobile phase material 11 via the first mobile phase material 12. Referring to FIG. 6, the polymer shell 2 is formed in a form surrounding the core 1 at the interface between the second mobile phase material 11 and the droplet discharged thereinto via polymerization between the first monomer contained in the dispersed phase solution 13 and the second monomer contained in the second mobile phase material 11. The polymer shell 2 encapsulates the core 1 in a spherical shape to minimize surface energy, and a dispersed phase solution supply device 31 may further be provided at one side of the reaction tank 10 for continuous production of capsules. In addition, a supply pressure regulator 33 to control a supply speed (or supply pressure) of the dispersed phase solution 13 may be provided at one side of the dispersed phase solution supply device 31, and the size of the produced capsules may be optionally adjusted by controlling the supply pressure. For example, each nozzle unit (pore) may produce capsules at a rate of 0.01 to 20 mL/min.

A material used to form the porous membrane 12 is not particularly limited so long as nozzle units penetrating the porous membrane 12 are formed. As an example, the porous membrane 12 may be formed of a polymeric or inorganic material, and any membranes for gas separation or water treatment may be used as the porous membrane 12.

The first monomer may include an organic compound or phosgene having at least one functional group selected from the group consisting of an isocyanate group, a carboxyl group, and a cyano group. The second monomer may be a compound having an amine group or a hydroxyl group. The first monomer and the second monomer may be condensation-polymerized to form a nylon shell. Alternatively, a polyurea, polyurethane, polycarbonate, or polyamide polymer shell may be formed. The polymerization step may be performed as a continuous process at a temperature of 25° C. to 120° C. The capsule according to an embodiment of the present invention may be in the form of particle remained at a temperature higher than a phase transition temperature of the phase transition material without undergoing a separate curing process due to the polymerization between the monomers.

The carbon nanomaterial may include at least one selected from the group consisting of graphite, graphite oxide, graphene, fullerene, carbon fiber, and carbon nanotube (CNT). The carbon nanomaterial may have a thermal conductivity of 2,000 W/m.K to 6,000 W/m.K.

The carbon nanomaterial may be used without limitation within an amount range that does not cause a significant change in thermal properties of the phase transition material. Specifically, the amount of the carbon nanomaterial may be in the range of 0.001 parts by mass to 40 parts by mass based on 100 parts by mass of the phase transition material.

The phase transition material according to the present invention may be an organic or inorganic material that stores thermal energy in the form of latent heat and dissipates the heat, thereby buffering a time difference between supply and use thereof. The phase transition material may be a material having a large thermal capacity during phase transition and phase transition thereof may occur at a predetermined temperature. For example, the phase transition material may be a material having a phase transition temperature of 10° C. to 100° C. Specifically, the phase transition material may include at least one selected from the group consisting of paraffin, naphthalene, biphenyl, erythritol, $C_{10-30}$ fatty acid, $C_{10-30}$ fatty alcohol, polycaprolactone (PCL), and polyethyleneglycol.

According to an embodiment of the present invention, the second mobile phase material may include a material having a density higher than that of the dispersed phase solution and lower than that of the first mobile phase material. For example, the second mobile phase material may include glycerin. The first mobile phase material does not include a monomer reacting with the first monomer and may have a higher density than that of the second mobile phase material.

Hereinafter, the present invention will be described in more detail with reference to the following experimental example. However, the experimental example is made only for illustrative purposes, and the present invention is not be construed as being limited to those experimental example.

Experimental Example

A dispersed phase solution including 50 wt % to 90 wt % of paraffin (tetradecane), 0.1 wt % to 40 wt % of graphene, and 1 wt % to 10 wt % of aidipoyl chloride was added to a reaction tank including a porous membrane. The dispersed phase solution was injected at a speed of 0.1 ml/min to 20 ml/min, and an intermediate coating layer was formed to a thickness of 20 mm. A mobile phase material including glycerin and hexamethylenediamine was located at an upper portion of the reaction tank. Formation of a droplet of the dispersed phase solution having passed through the nozzle unit of the porous membrane, migration of the droplet into the mobile phase material, and separation of the droplet were observed.

Figure 7:
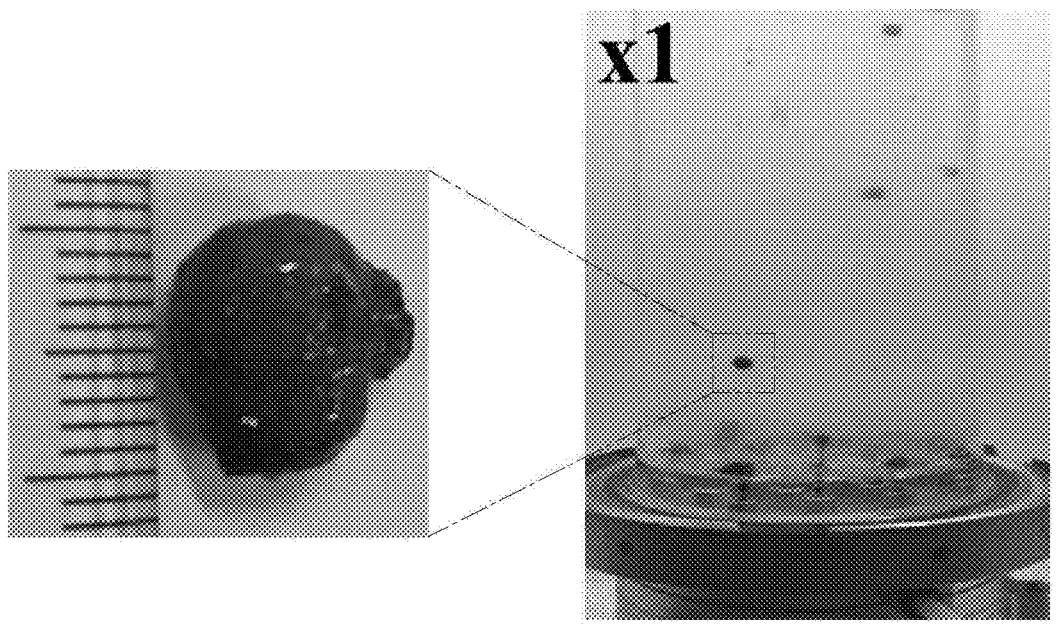
FIG. 7 shows capsules having various sizes fabricated according to an embodiment of the present invention.

Referring to FIG. 7, it may be confirmed that the capsule having a core-shell structure may be controlled to have various sizes of about 1 cm.

Figure 8:
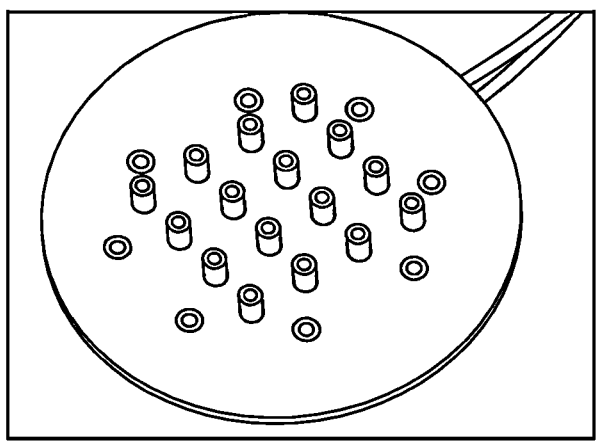
FIG. 8 shows an apparatus for fabricating capsules according to an embodiment of the present invention.
Figure 8:
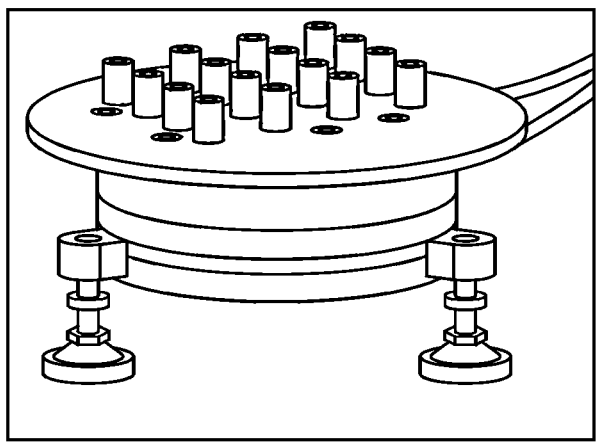
Figure 8:
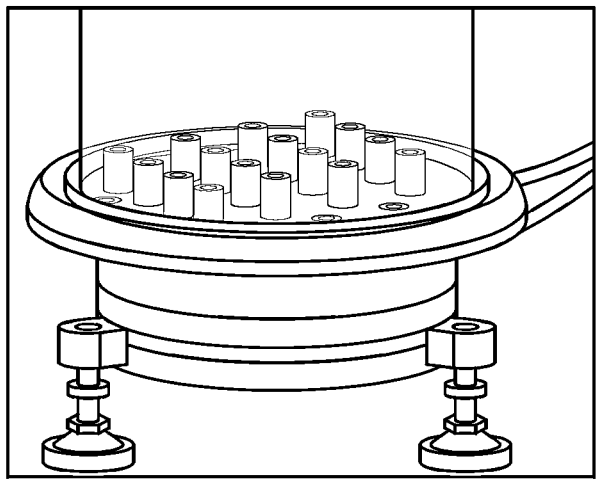

FIG. 8 shows an apparatus for fabricating capsules according to an embodiment of the present invention. According to the embodiment, since a plurality of nozzle units are provided in the reaction tank, capsules may be mass-produced at a maximum rate of 1200 mL/min in a wide range of sizes from a submicron to a several centimeter by adjusting the sizes of the nozzle units.

According to the embodiment of the present invention as described above, capsules may be mass-produced by a simple process without using a density gradient or a curing process. Also, by adjusting the sizes of the nozzle units, the sizes of the capsules may be uniformly controlled. In addition, the sizes of the capsules may be selectively controlled by adjusting the injection flow rate of the dispersed phase solution. However, the scope of the present invention is not limited by these effects.

While one or more embodiments of the present invention have been described with reference to the drawings, it will be understood by those of ordinary skill in the art that various changes in form and details may be made therein without departing from the spirit and scope of the present invention as defined by the following claims.

What is claimed is:

1. A method of fabricating capsules, the method comprising:
    forming droplets of a dispersed phase solution comprising a phase transition material, a carbon nanomaterial, and a first monomer by allowing the dispersed phase solution to pass through nozzle units provided at a porous membrane in a reaction tank comprising the porous membrane;
    migrating the droplets into a mobile phase material comprising a second monomer; and
    forming polymer shells respectively at interfaces between the droplets and the mobile phase material by polymerization between the first monomer and the second monomer.

2. The method of claim 1, wherein the first monomer comprises an organic compound or phosgene having at least one functional group selected from the group consisting of an isocyanate group, a carboxyl group, and a cyano group.

3. The method of claim 1, wherein the second monomer is a compound having an amine group or a hydroxyl group.

4. The method of claim 1, wherein the carbon nanomaterial is selected from the group consisting of graphite, graphene, carbon fiber, and carbon nanotube (CNT).

5. The method of claim 1, wherein the forming of droplets is performed by allowing the dispersed phase solution to pass through the nozzle units at a flow rate of 0.1 ml to 20 ml.

6. The method of claim 1, wherein the polymerization is performed as a continuous process in a temperature range of 25° C. to 120° C.

7. The method of claim 1, wherein the phase transition material comprises at least one selected from the group consisting of paraffin, naphthalene, biphenyl, erythritol, $C_{10-30}$ fatty acid, $C_{10-30}$ fatty alcohol, polycaprolactone (PCL), and polyethyleneglycol.

8. The method of claim 1, wherein:
    the forming the droplets comprises
        providing the dispersed phase solution up to predetermined height in the reaction tank, and
        disposing the porous membrane on the dispersed phase solution at a position spaced apart from a bottom of the reaction tank; and
    the migrating the droplets comprises applying a pressure to the dispersed phase solution in the reaction tank to force the dispersed phase solution to pass through the nozzle units.

* * * * *